May 23, 1967     J. R. CUMBERLAND     3,320,849
GLASS THICKNESS GAUGE
Filed April 3, 1963
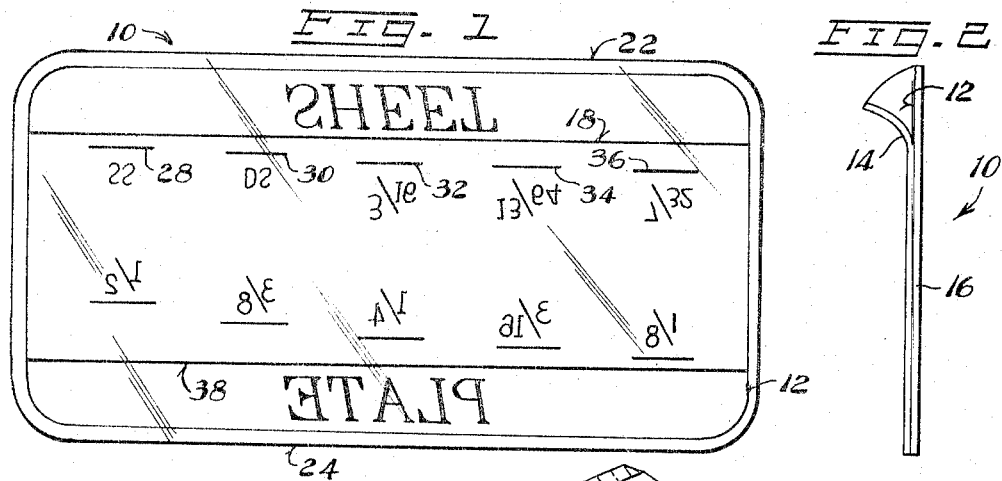
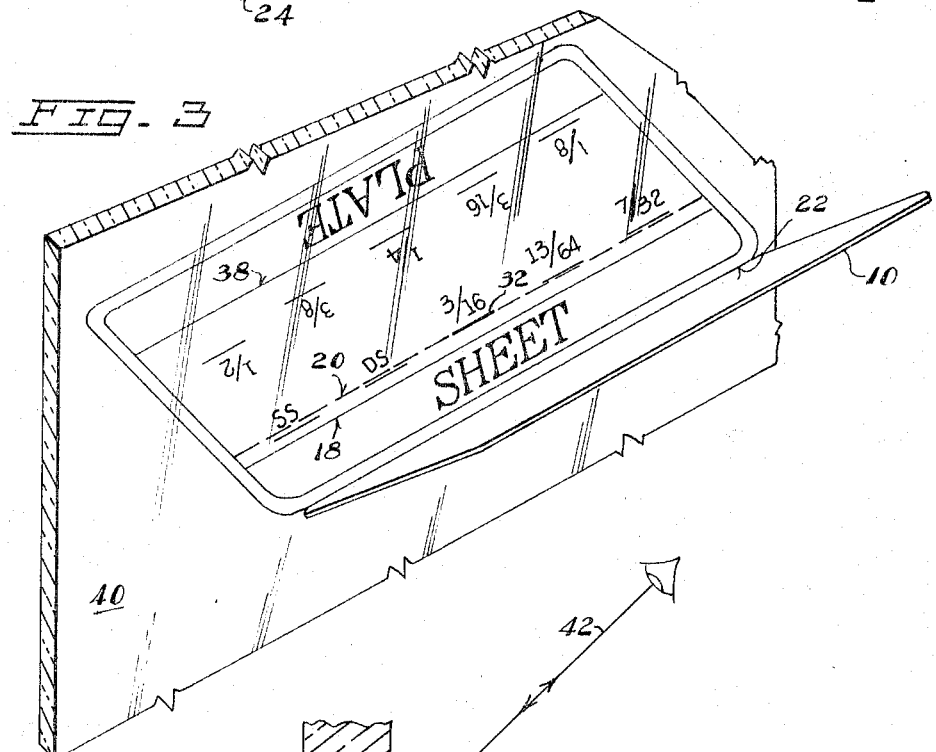
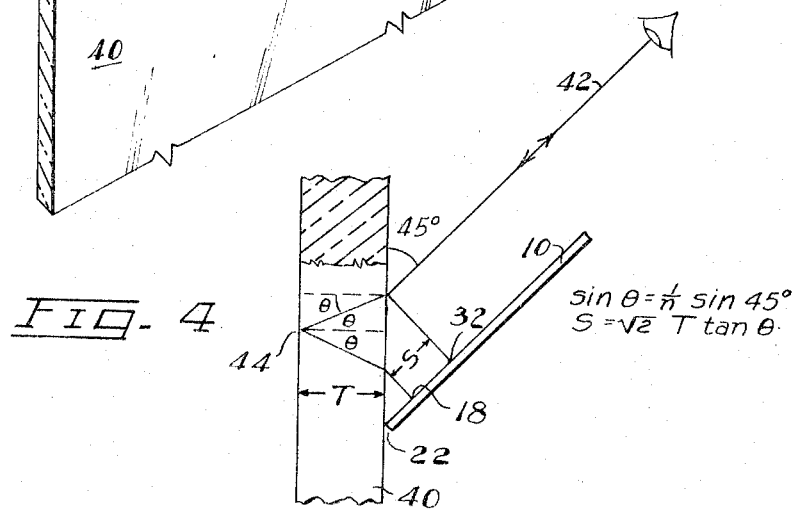
$$\sin \theta = \tfrac{1}{n} \sin 45°$$
$$S = \sqrt{2}\, T \tan \theta$$

3,320,849
GLASS THICKNESS GAUGE
Joseph R. Cumberland, 5416 24th Ave. SE.,
Washington, D.C. 20031
Filed Apr. 3, 1963, Ser. No. 270,399
1 Claim. (Cl. 88—14)

This invention pertains to a device for gauging the thickness of transparent sheets such as window glass or the like, and especially for use where physical access to only one side of the sheet is possible. A particularly valuable field of application for the device lies in the thickness inspection of window panes and the like which have already been installed in houses or other buildings.

Principal objects of the invention are to provide an extremely simple, rugged and economical optical thickness gauge which has no moving parts, and whose operation is so simple that it can be used with good results by relatively unskilled personnel. A further object is to provide a method of gauging glass thickness based on the use of such a gauge.

In a particular preferred embodiment, designed for establishing whether a pane of glass meets a prescribed thickness specification, the device consists of a rigid sheet carrying a group of pairs of fiducial lines whose spacings are such that, when it is applied to the pane being tested, the first-surface reflection of one line of a pair will be superimposed on or aligned with the second-surface reflection of the other line of that pair when, and only when, the glass sheet meets the minimum allowable thickness for a commercial nominal gauge specified by a designation associated with that pair of lines. By providing several such pairs of fiducial lines, the device can be used for gauging a variety of commercial nominal thicknesses of glass. The device provides adequate separation of the pairs of lines for each glass-thickness to avoid any possibility of confusion.

A presently preferred embodiment of the invention will now be described in detail by way of example, together with the method of using it, but it will be understood that the scope of the invention is defined in the claim at the end of this specification. In the accompanying drawings:

FIG. 1 is a plan view of the gauging device of the invention.

FIG. 2 is a side view thereof with a corner peeled back to show its laminated construction.

FIG. 3 is a perspective view of the device in use during a gauging operation.

FIG. 4 is a diagram explaining the optical principle of the device.

A plan view of the selected embodiment is shown in FIG. 1, the gauge as a whole being designated by reference numeral 10, and comprising a generally rectangular sheet of relatively stiff material bearing imprints some of which are fiducially related to the edges of the sheet or card. In this form, and for portability and low cost, the device is formed of a printed sheet of opaque white paper 12, sandwiched or laminated between sheets of transparent plastic 14 and 16, as graphically indicated in FIG. 2. The plan dimensions of the card may be approximately two inches by four inches, but these are not critical.

Since in actual use the gauge surface of the device will be viewed by reflection in the glass sheet being tested, the printing on the surface is mirror-image inverted. When either longitudinal edge of the card is held in a horizontal position against the glass pane 40, as shown in FIG. 3, and with the plane of the gauge inclined at about 45 degrees to the glass surface, the user will be able to view the virtual image of the gauge surface from above, along a preferred viewing axis which is parallel to the actual plane of the gauge and hence approximately perpendicular to the plane of the reflected image. In fact, of course, the user will be able to see two reflected images of the gauge, which will be displaced from one another in the direction of the shorter dimension of the gauge. Moreover, these two images will be quite distinct, because the lines constituting the image reflected from the first (nearer the user) surface of the pane will be somewhat brighter than the lines constituting the reflection from the second or rear surface, due to absorption of light by two passages through the pane itself. In FIG. 3, for example, the first-surface reflection of the long straight line 18 will be blacker and more intense than the "grayish" second surface reflection of that same line, indicated by the dashed image line at 20.

Returning for the moment to the gauge itself, as shown in FIG. 1, the printing is provided in two sets, occupying the opposite longitudinal halves of the gauge surface, and intended for use in gauging either commercial window glass panes designated by the word "Sheet," or for use in gauging plate glass panes, designated by the word "Plate." For gauging sheet glass, the longitudinal edge 22 is held against the pane as in FIG. 3, and the word "Sheet" and the appurtenant gauge marks and letter or numeral designations will be viewed. For gauging plate glass, of course, the opposite longitudinal edge 24 will be held against the pane, and the other set of indicia will be viewed.

Approximately parallel to the long edge 22 in FIG. 1 is the long printed straight line 18 at any convenient distance from the edge 22. Printed parallel to this line 18 are a series of spaced-apart shorter lines 28, 30, 32, 34 and 36, whose respective distances from the line 26 are established in accordance with the minimum-tolerance thicknesses of the various commercial grades of sheet window glass encountered. Thus, the line 28 has the associated reverse-printed designation "SS," meaning single-strength, while line 30 has the designation "DS" for double-strength. The remaining lines carry nominal thickness designations in fractions of an inch.

The other longitudinal half of the gauge is similar to that just described, but of course is marked "Plate," and it also has a lengthwise fiducial line, designated 38, and a set of separate shorter lines that are spaced from line 38 by respective distances calculated in accordance with the minimum permitted thicknesses of the various gauges of plate glass which are indicated by the associated reverse-printed markings in fractions of an inch of pane thickness.

The operation of the device, and an understanding of its optical principles, will be better apprehended from the schematic vertical sectional view of FIG. 4. Here, as in FIG. 3, the glass pane being gauged is designated by numeral 40. The user holds the gauge 10 at approximately a 45-degree angle to the pane, with one longitudinal edge (22) against the pane and conveniently in a horizontal direction. The position of the long line 18 is indicated, as in the position of the short line 32. The typical central ray from the latter line, by first-surface reflection from the pane, passes to the user's eye along the viewing axis line 42. At the same time, the typical ray from the long line 18 is refracted at the first surface of the pane, then reflected from the second surface (at 44) and again reflected at the first surface to superimpose upon the same final ray direction or viewing axis line 42. This is the situation indicated pictorially in FIG. 3, with the dashed second-surface image 20 of line 18 superimposed on the first-surface image of the short line 32.

It is obvious from the foregoing that by properly positioning each of the shorter lines from the long line, and making allowance for the (rather slight) variations in index of refraction of commercial sheet and plate glasses, the gauge will enable the user to determine easily whether he pane 40 being inspected falls within the permissible range of thicknesses. Since he can instantly refer to the alignment or lack of alignment of the markings to either side of the set which is of direct interest, a judgment is readily made as to whether the pane is over-thick or under-thick.

The showing in FIG. 3 has been somewhat simplified by omitting the second-surface reflected images of all of the markings other than that of line 18, as these would merely confuse the drawing. However, in actual use, these other second-surface reflections are readily ignored by the user, since they will lie far away, both vertically and horizontally, from the region of direct interest. This is one reason for the lateral spacing of the short fiducial marks or lines such as 28, 30, 32 et cetera. Attempts to arrange a gauge with such short lines in columnar or vertical-row fashion, rather than laterally of one another parallel to the directions of edges 22 and 24, introduce hopeless confusion amongst the multiple images.

As indicated by the formulas in FIG. 4, the required spacings between long line 18 and its associated short lines, as well as between long line 38 and its short lines, can readily be calculated. For ordinary window glass having an index of refraction ($n$) of say 1.500, the angle theta is determined, and the spacing S for a given value of glass thickness T is likewise determined. As a practical matter, however, the existance of a range of allowable actual thicknesses for a given nominal or trade thickness makes it preferable to establish the line spacings by trial, particularly since the paper sheet 12, if printed in the ordinary way, will be subject to process shrinkage, and photographic processes employed will also have their effect. In an actual commercial form, the spacing from line 32 to line 18 was substantially 0.120 inch, while the spacing from line 38 to the "$3/16$" mark on the Plate side was 0.108 inch. The difference, of course for the same nominal or trade thickness, is accounted for by the fact that $3/16$ inch plate glass is made from $3/16$ inch sheet glass with grinding and polishing steps that remove some of the thickness.

What is claimed is:

An optical thickness gauge for transparent sheets, consisting of a thin rigid substantially rectangular light-reflective card having a visible line extending lengthwise thereof and parallel to one longitudinal edge of the card, and a plurality of laterally spaced shorter visible lines parallel to and individually spaced from said first visible line by distances corresponding to the thicknesses of commercial varieties of such transparent sheets; all of said lines being disposed within one longitudinal half-area of said card, and the other longitudinal half-area of said card carrying additional similar sets of lines corresponding to the thickness of other transparent sheets.

References Cited by the Examiner
UNITED STATES PATENTS

| | | | |
|---|---|---|---|
| 1,503,543 | 8/1924 | Lytle | 84—14 |
| 1,671,709 | 5/1928 | Gallasch | 88—14 |
| 3,257,895 | 6/1966 | Garraway | 88—14 |

JEWELL H. PEDERSEN, *Primary Examiner.*

O. B. CHEW, *Assistant Examiner.*